United States Patent Office 2,796,647
Patented June 25, 1957

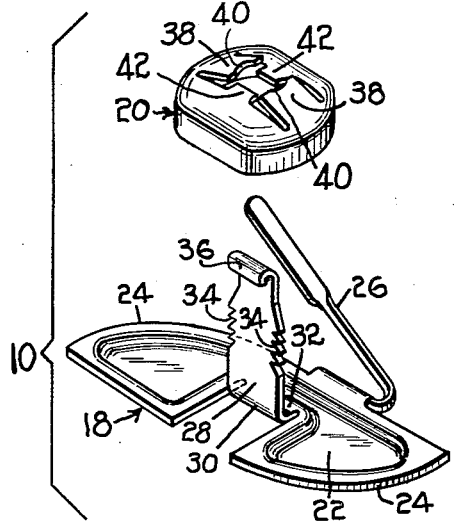
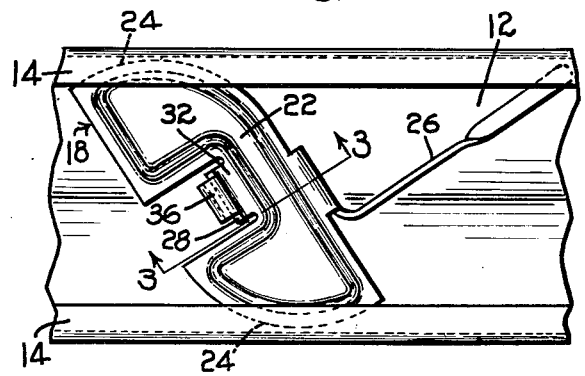
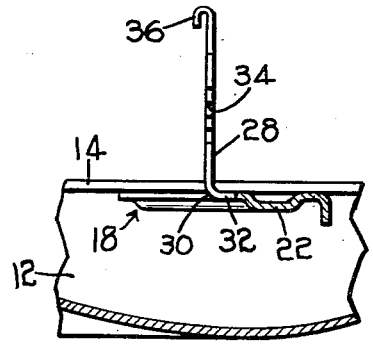
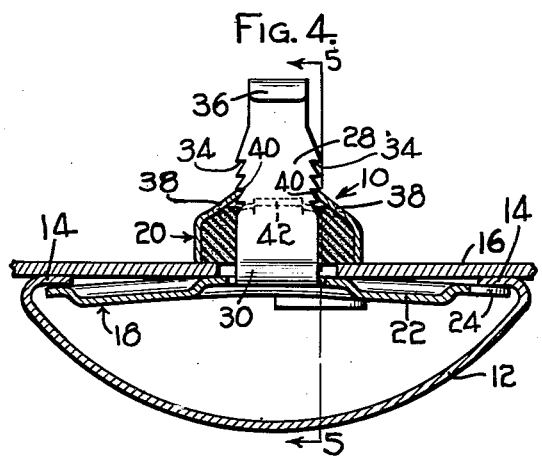
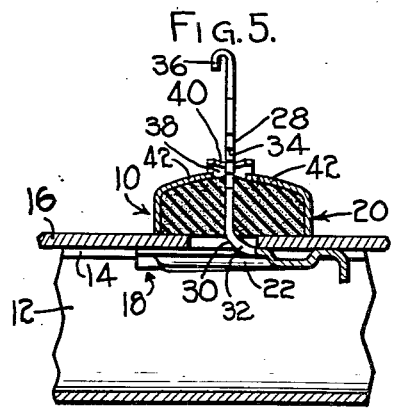
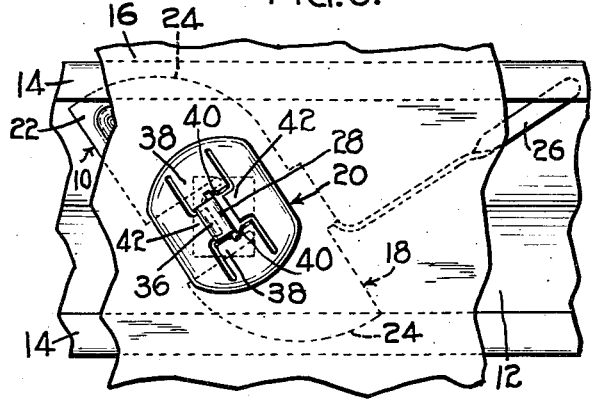
INVENTOR:
WILLIAM A. BEDFORD JR.,
BY Robert E Ross
ATTORNEY.

2,796,647
FASTENING DEVICES FOR MOLDING AND THE LIKE

William A. Bedford, Jr., North Scituate, Mass., assignor, by mesne assignments, to United-Carr Fastener Corporation, Boston, Mass., a corporation of Delaware Application July 8, 1954, Serial No. 441,975

1 Claim. (Cl. 24—73)

This invention relates generally to fastening devices, and has particular reference to a device for securing an article to an apertured panel.

In the construction of automobiles, refrigerators and the like, it is necessary to attach various devices such as channelled moldings having inturned edges to sheet metal panels. Devices commonly used for this purpose provide a portion for engagement with the molding, and a bolt assembled therewith for extending through a panel opening to be engaged by a nut. Such devices are satisfactory for many applications, but in cases access to the rear of the panel is limited making assembly of the nut difficult, and the assembly of the bolt onto the molding engaging portion during manufacture requires an extra operation which adds to the expense of the finished fastener.

The object of the invention is to provide a fastening device for rapidly and economically attaching a channelled molding to a supporting panel.

A further object of the invention is to provide a molding fastener having integral stud means for extending through a support panel opening.

A still further object of the invention is to provide a molding fastener and an attaching member which are adapted to be assembled onto opposite sides of a support panel without rotation of the attaching member.

Other objects of the invention will, in part, be obvious, and will, in part, appear hereinafter.

In the drawing:

Fig. 1 is a perspective view of a fastening device embodying the features of the invention;

Fig. 2 is a view in elevation of the molding engaging portion of the fastener of Fig. 1 assembled into a molding;

Fig. 3 is a view in section taken on line 3—3 of Fig. 2;

Fig. 4 is a view in section of the fastening device of Fig. 1 assembled with a molding and attached to a supporting panel;

Fig. 5 is a view in section taken on line 5—5 of Fig. 4; and

Fig. 6 is a top plan view of the assembly of Fig. 5.

Referring to the drawing there is illustrated a fastening device 10 for securing a channelled molding 12 having inturned edges 14 to a support panel 16.

The device 10 comprises generally a molding engaging portion 18 and an attaching portion 20 for assembly onto opposite sides of the panel 16. The portion 18 is preferably formed of a single piece of sheet metal and comprises in the illustrated embodiment a cross-plate 22 having opposite rounded corners 24, a spring tail 26 joined to the cross-plate at one side thereof, and an integral flat stud 28 projecting from the plane of the plate.

The stud 28 is joined to the plate substantially centrally thereof, by a rounded portion 30 and a short laterally extending portion 32 for a purpose to appear hereinafter.

To provide means for engagement with the attaching member, the side edges of the stud 28 are provided with a series of ratchet teeth 34, and to provide means for engagement with an attaching tool, the end of the stud is provided with a reverse bend portion 36.

The attaching portion 20 comprises a central stud engaging portion provided by a pair of spring arms 38 having opposing ends with medially disposed notched portions 40, and flat ended tongues 42 extending between the arms so as to be disposed on opposite sides of the inserted stud to prevent rotation of the attaching member on the stud and to facilitate guiding the stud into the proper position in the attaching member aperture.

To strengthen the attaching member, it may be provided with a depending periphery 44.

To assemble a molding onto a panel by means of the fastening device 10, the molding engaging portion 18 is first assembled into the molding with the cross-plate 22 spanning the molding with the corners 24 disposed behind the inturned edges and the spring tail 26 flexed outwardly to be disposed behind an inturned edge. The molding is then placed against the panel so that the stud 28 extends through a suitably positioned panel opening, and the attaching member is then pushed over the protruding end of the stud. If desired, a sealing gasket 46 may be assembled onto the stud between the panel and the attaching member. By means of a suitable tool (not shown) the attaching member may be pushed onto the stud and at the same time the stud may be pulled in the opposite direction. The construction of the cross-plate and the stud enables it to move in a direction perpendicular to the plate, by reason of the flexing of the plate toward the panel (see Fig. 4) and by reason of the flexing of the laterally extending portion 32 of the stud.

The spacing between the individual teeth 34 is smaller than the total possible axial movement of the stud, so that the attaching member can engage a tooth which will retain the stud in an axially extended position to cause the fastener to tightly grip the panel.

Although the illustrated embodiment is particularly adapted to securing moldings to panels, the features of the invention may be readily adapted to attaching other articles to a panel.

Although the illustrated molding fastener is the type which utilizes the laterally flexible spring tail to retain the fastener in position in the molding, other types of molding engaging portions may be used. The stud, which is flat in the illustrated embodiment, may in some cases, have other transverse shapes with attaching members suitably shaped to receive it.

Since certain other obvious modifications may be made without departing from the scope of the invention, it is intended that all matter contained herein be interpreted in an illustrative and not in a limiting sense.

I claim:

A fastening device for assembly with an article or the like for securing same to a support, said article having inturned flanges along the side edges thereof forming opposing recesses, said device comprising an elongated cross plate for spanning the distance between the inturned edges, said cross plate having a tongue member extending laterally from the central portion thereof and bent at substantially right angles thereto forming upstanding, flat, stud means centrally positioned with respect to said plate for protruding through an opening in the support, the side edges of the medial portion of said stud means provided with ratchet teeth formed thereon, the upper free end of said stud means being narrower in width with the free end thereof reversely bent forming a hook portion for engagement with a tool to draw the stud means through a support opening, and an attaching member for assembly onto the stud means, said attaching member having a central stud means engaging portion provided by a pair of spring arms having opposing ends with medially disposed notch portions and flat ended tongues extending between said spring arms so as to be disposed on opposite sides of the inserted stud means to prevent rotation of the attaching member on said stud.

References Cited in the file of this patent
UNITED STATES PATENTS

| | | |
|---|---|---|
| 1,765,052 | Carr | June 17, 1930 |
| 2,225,394 | Tinnerman | Dec. 17, 1940 |
| 2,265,957 | Tinnerman | Dec. 9, 1941 |
| 2,502,539 | Tinnerman | Apr. 4, 1950 |
| 2,671,254 | Meyer | Mar. 9, 1954 |